Figure 1:
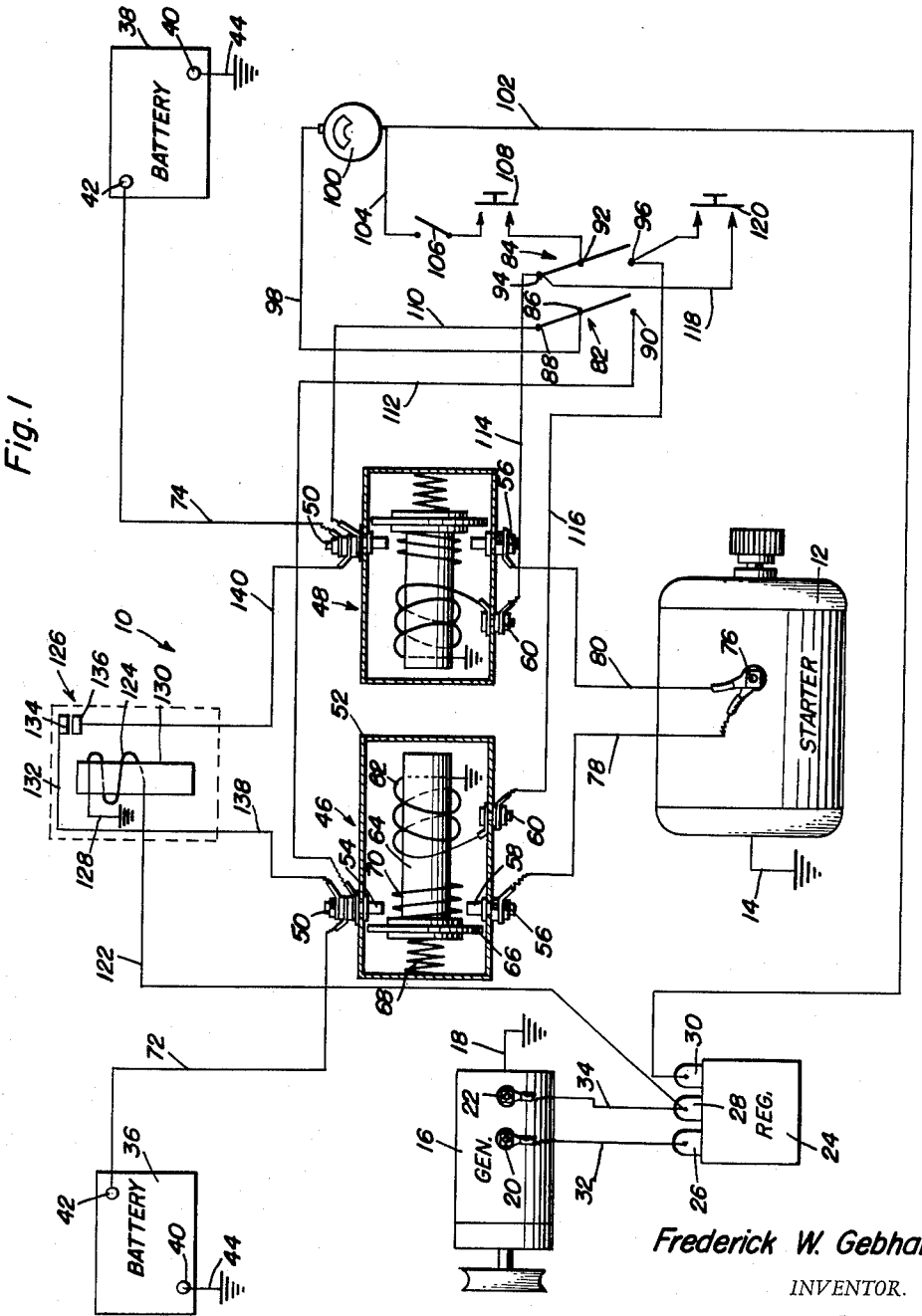

Oct. 22, 1963  F. W. GEBHARD  3,108,190
PLURAL BATTERY SYSTEM FOR VEHICLES
Filed Dec. 23, 1958  3 Sheets-Sheet 1

Frederick W. Gebhard
INVENTOR.

BY Clarence A. O'Brien
and Harvey B. Jacobson
Attorneys

Oct. 22, 1963  F. W. GEBHARD  3,108,190
PLURAL BATTERY SYSTEM FOR VEHICLES
Filed Dec. 23, 1958  3 Sheets-Sheet 2

Frederick W. Gebhard
INVENTOR.

BY
*Clarence A. O'Brien*
*and Harvey B. Jacobson*
Attorneys

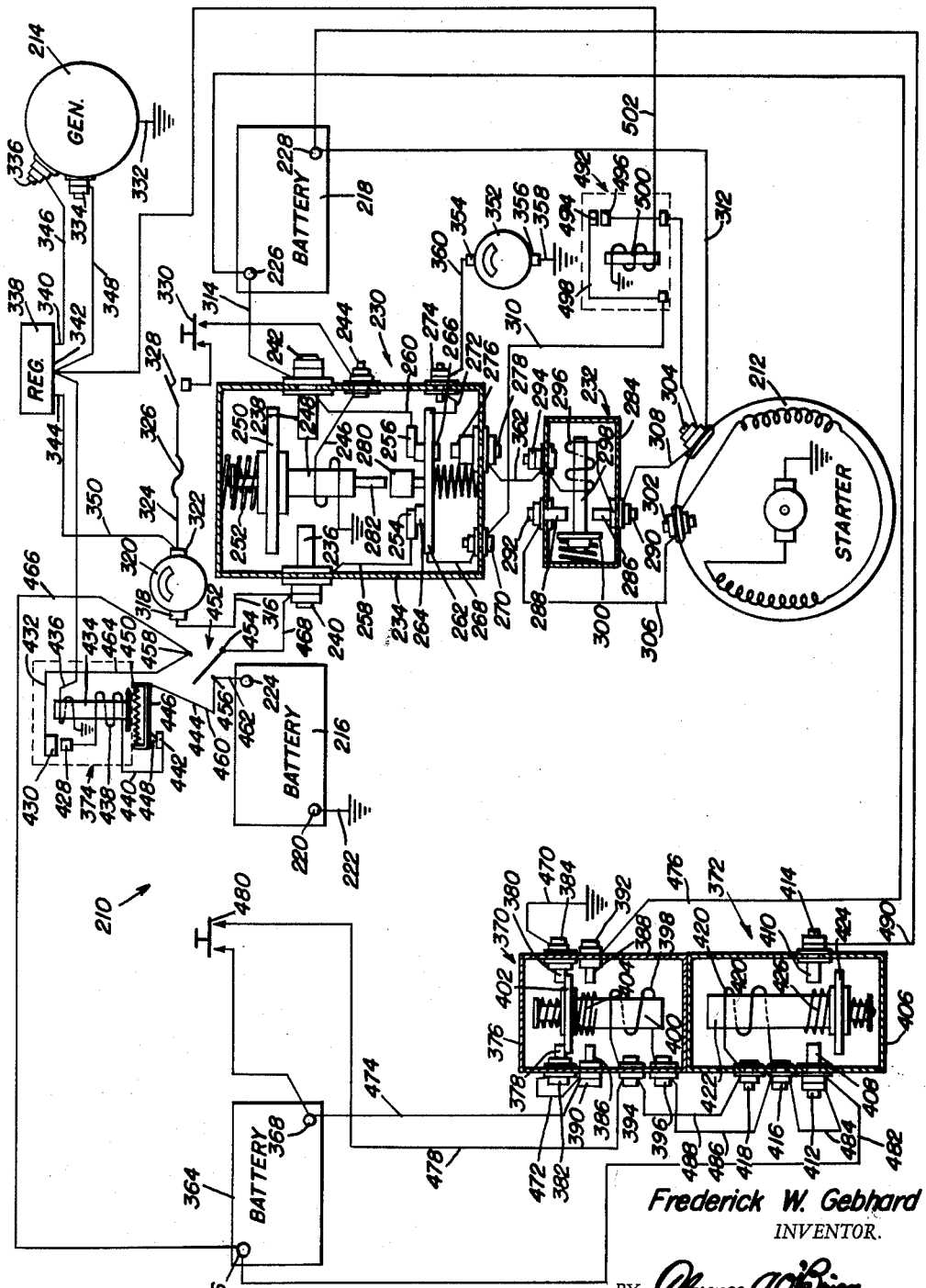

United States Patent Office 3,108,190
Patented Oct. 22, 1963

3,108,190
PLURAL BATTERY SYSTEM FOR VEHICLES
Frederick W. Gebhard, 322 3rd St., West Easton, Pa.
Filed Dec. 23, 1958, Ser. No. 782,551
6 Claims. (Cl. 290—36)

This invention relates in general to new and useful improvements in electrical systems of vehicles, and more specifically to a multiple battery system for vehicles.

This invention constitutes an improvement on my copending application Serial No. 632,242, filed January 2, 1957, now Patent No. 2,866,907, issued December 30, 1958.

The primary object of this invention is to provide a dual battery system for vehicles which is of such a nature whereby a vehicle may be provided with two batteries and the two batteries so connected to the electrical system whereby the two batteries may be selectively incorporated in the electrical system to assure the availability of one battery at all times thus eliminating the possibility of a dead battery when it is necessary to start the vehicle.

Another object of this invention is to provide a dual battery system for vehicles, the dual battery system being of a such a nature whereby the individual batteries may be selectively connected into the electrical system of the vehicle and at the same time is of such a nature whereby as the generator of the vehicles reaches a predetermined charging stage, it will be connected to both of the batteries so as to simultaneously charge the two batteries.

Another object of this invention is to provide a dual battery system for vehicles, the dual battery system being of such a nature whereby the batteries may be selectively incorporated in the electrical system of a vehicle and when the vehicle is being started, the two batteries may be connected in parallel to facilitate the starting of the vehicle.

Another object of this invention is to provide a dual battery system for vehicles, the dual battery system including means whereby the two batteries may be connected together in parallel with the starter of the vehicle of which they are a part, or may be connected together in series when desired for the jump starting of another vehicle of a different voltage whereby two 6-volt batteries may be mounted in a service vehicle and the service vehicle may be used for the purpose of starting vehicles having 12-volt electrical systems.

Another object of this invention is to provide a multiple battery system of vehicles, the multiple battery system being of such a nature whereby an individual one of the batteries may be selectively connected to the electrical system of a vehicle and at the same time when the generator of the vehicle has reached a predetermined charging rate, both batteries will be connected to the generator to facilitate charging thereof, the charging circuit for the two batteries incorporating a thermal circuit breaker for protecting the switch of the charging circuit.

A further object of this invention is to provide in conjunction with a dual battery system a third battery, the third battery being so electrically connected to the remainder of the electrical system of a vehicle whereby it may be selectively placed in the line in lieu of either of the two original batteries, the third battery also being capable of being charged when in the electrical system of the vehicle.

Another object of this invention is to provide a three battery system for use in conjunction with a two battery vehicle system, the two battery vehicle system being of such a nature whereby the two batteries are connected together in parallel during the normal operation of the vehicle, while connected together in series during the starting of the vehicle, the third battery being so electrically connected to the electrical system of the vehicle whereby it may be substituted for either of the original two batteries in starting.

Figure 2:
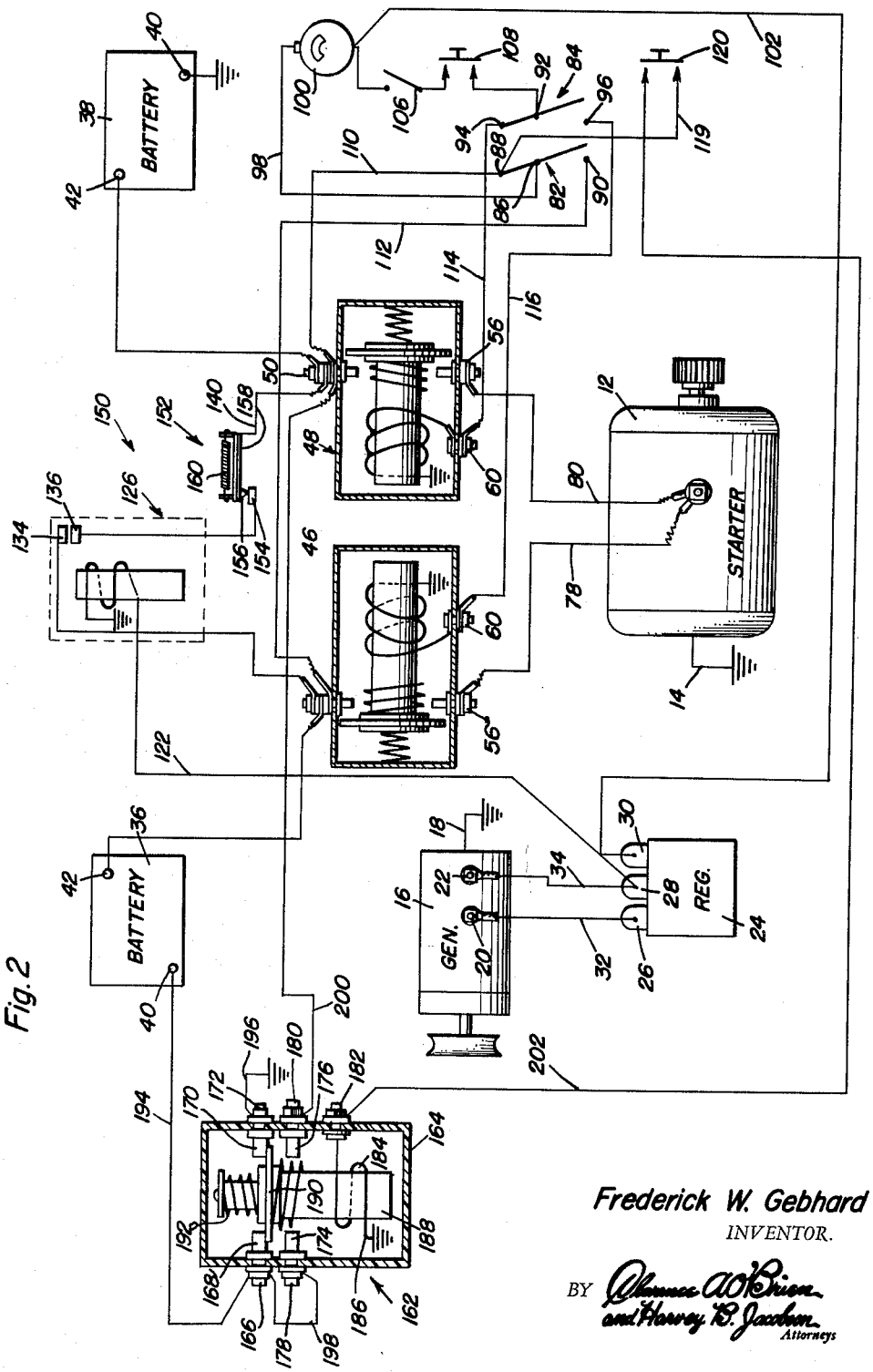

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a current diagram of a simplified form of the invention and shows the manner in which the two batteries may be connected to the electrical system of the vehicle for either alternate use during the normal operation of the vehicle or for simultaneous use in the starting of the vehicle;

FIGURE 2 is a wiring diagram similar to FIGURE 1 and shows added thereto an additional circuit for placing the batteries in series when it is desired to jump start another vehicle having an electrical system where voltage is twice that of the single batteries; and FIGURE 3 is a wiring diagram of a dual battery electrical system of a diesel vehicle which has incorporated therein a third battery and either a cut-in or cut-out solenoid either or both of which will greatly improve the diesel vehicle electrical system.

Referring now to FIGURE 1 in particular, it will be seen that there is illustrated an electrical system which is referred to in general by the reference numeral 10. The electrical system 10 includes a conventional vehicle starter 12 which is grounded by means of a ground wire 14. The electrical system also includes a conventional vehicle generator 16 which is grounded by means of a ground wire 18. The generator 16 also has a field terminal 20 and an armature terminal 22. The conventional vehicle electrical system includes a voltage regulator 24 which has terminals 26, 28 and 30. The regulator 24 is of the type including an automatic switch for establishing a battery charging connection when the generator voltage is sufficient for battery charging. Connected to the terminal 26 is a wire 32 extending to the field terminal 20 of the generator 16. A second wire 34 extends between the armature terminal 22 and the terminal 28 of the voltage regulator 24.

The electrical system 10 also includes a pair of batteries 36 and 38 constituting main and reserve batteries. The batteries 36 and 38 include first terminals 40 and second terminals 42. The terminals 40 are like terminals, that is they are both either plus or minus and the terminals 42 are like terminals. Terminals 40 are grounded by means of ground wire 44.

The electrical system 10 also includes a pair of identical solenoid switches which are referred to in general by the reference numerals 46 and 48. Inasmuch as the solenoid switches 46 and 48 are identical, only the solenoid switch 46 will be described in detail. The solenoid switch 46 includes a terminal 50 which is carried in insulated relation by means of a housing 52. The terminal 50 terminates within the housing 52 in the form of a contact 54. Also carried by the housing 52 in opposed relation to the terminal 50 is a terminal 56 which terminates within the housing 52 in a contact 58. The third terminal 60 is carried by the housing 52 in insulated relation.

Disposed within the housing 52 is a coil 62 which is connected to the terminal 60 and whose opposite end is connected to the housing 52, the housing 52 being grounded. Movable relative to the coil 62 is a plunger 64 carrying a contact bridging member 66 which is adapted to bridge the contacts 54 and 58. The contact bridging members 66 is normally payed out of engagement with the contacts 54 and 58 by means of springs 68 and 70. It is to be noted that the second terminal 42 of the battery 36 is connected to the terminal 50 of the switch 46 by means of a wire 72. A similar wire 74 connects the terminal 42 and the battery 38 to the terminal 50 of the switch 48.

The starter 12 has a terminal 76. Connected to the terminal 76 are wires 78 and 80 which are connected to the terminals 56 of the two switches 46 and 48.

The electrical system 10 also includes a battery interchange switch assembly comprising a pair of switches 82 and 84 which are of the single-pole double-throw type and which are so connected together whereby the switches are thrown in unison. The switch 82 includes a central terminal 86 with a pair of spaced terminals 88 and 90. The switch 84 includes a central terminal 92 and spaced terminals 94 and 96 which correspond to the terminals 88 and 90, respectively.

The central terminal 86 has connected thereto a wire 98 which is in turn connected to an ammeter 100. Connected on the opposite side of the ammeter 100 is a wire 102 which is in turn connected to the terminal 30 of voltage regulator 24 for connection to the accessory circuits. Extending between the wire 102 and the central terminal 92 is a wire 104. Incorporated in the wire 104 is the usual ignition switch 106 and the usual starter switch 108.

Connected to the terminal 88 is a wire 110 whose opposite end is connected to the terminal 50 of the switch 48. A similar wire 112 is connected to the terminal 90 at one end of the wire 112 and to the terminal 50 of the switch 46 at the opposite end of the wire 112. Thus it will be seen that the switch 82 may control the individual charging of the batteries 36 and 38 as well as the connecting of the batteries 36 and 38 into the electrical system of the vehicle during the normal running thereof after the vehicle has been started.

Connected to the terminal 94 is a wire 114 whose opposite end is connected to the terminal 60 of the switch 48. A similar wire 116 extends between the terminal 60 of the switch 46 and the terminal 96. Thus, the switch 84 may be used to select which of the switches 46 and 48 is to be closed during the starting of the vehicle. When it is desired to simultaneously close both the switches 46 and 48, the switch 84 is bridged by means of a wire 118 which is connected at opposite ends to the terminals 94 and 96 and which is provided intermediate its ends with a pushbutton type load starter switch 120.

Although the switch 82 controls the independent charging of the batteries 36 and 38, it is desired that the batteries 36 and 38 be simultaneously charged whenever possible. Accordingly, connected to the terminal 28 of the voltage regulator is a wire 122 whose opposite end is connected to a coil 124 of a solenoid actuator switch which is referred to in general by the reference numeral 126. The opposite end of the coil 124 is grounded as at 128. Extending through the coil 124 is a plunger 130 which is used to pull down an arm 134. Movable contact 134 will engage a fixed contact 136 of the switch 126. Extending between the movable contact 134 and the terminal 50 of the switch 46 is a wire 138. A similar wire 140 extends between the terminal 50 of the switch 48 and the fixed contact 136. Thus when the electrical output of the generator 16 has reached a predetermined rate, the energization of the coil 124 will be sufficient to pull down the arm 132 and move the contact 134 into engagement with the contact 136. This will simultaneously connect together the batteries 36 and 38 to the generator 16 for receiving electrical energy therefrom.

In the normal use of the dual battery system 10, one of the batteries 36 and 38 will be considered the main battery and the other of the batteries will be considered the reserve battery. Inasmuch as the two batteries 36 and 38 are so connected to the generator 16 whereby once the output of the generator 16 has reached a predetermined rate, both batteries 36 and 38 will be connected to the generator for receiving electrical energy therefrom, the reserve battery will be fully charged at all times and ready for use. Therefore, when the operator of the vehicle either finds it necessary or deems it advisable to utilize the reserve battery, by changing the position of the switches 82 and 84, the heretofore reserve battery becomes the main battery and the heretofore main battery becomes the reserve battery. In the normal use of the electrical system 10, only the main battery will be used for the purpose of starting the vehicle. On the other hand, should it be desired to connect both of the vehicle batteries 36 and 38 together parallel for the purpose of starting the vehicle, particularly on a cold morning, then it is merely necessary to additionally close the switch 120. The switch 120 is held closed only during the starting operation. The switch 120 is then released and the vehicle continues to operate on a single one of the batteries.

Referring now to FIGURE 2 in particular, it will be seen that there is illustrated a modified form of dual battery system, which dual battery system is referred to in general by the reference numeral 150. The dual battery system 150 incorporates all of the components of the dual battery system 10 and has added thereto extra circuits and components. Accordingly, only those circuits and components which are added to the dual battery system 10 will be described in detail here.

In the first place, it may be desired to charge both batteries 36 and 38 for only a short period of time. Accordingly, there is incorporated in the wire 140 a circuit breaker which is referred to in general by the reference numeral 152. The circuit breaker includes a fixed contact 154 and a movable contact 156 which cooperates with the fixed contact 154. The movable contact 156 is carried by a bimetallic arm 158 which is of such a nature whereby when cool, it urges the contact 156 into engagement with contact 154, but when overheated, urges the movable contact 156 out of engagement with the fixed contact 154. Disposed parallel to the arm 158 and electrically connected in parallel relation thereto is a heating coil 160. In the electrical circuit of FIGURE 1, the wire 118 extends between the switch 120 and the terminal 94. In lieu of the wire 118, there is provided a wire 119 which connects the switch 120 to the terminal 88.

The electrical system 150 also includes a solenoid actuated switch which is referred to in general by the reference numeral 162. The switch 162 includes an insulated housing 164 which carries a terminal 166 which terminates within the housing 164 as a contact 168. Disposed directly opposite to the contact 168 is a contact 170 which terminates outside of the housing 164 in a terminal 172.

Also carried by the housing 164, but in spaced parallel relation to the contacts 168 and 170 are contacts 174 and 176. The contact 174 terminates exterior of the housing 164 in a terminal 178 and the contact 176 terminates exterior of the housing 164 in a terminal 180. The housing 164 also carries a terminal 182 to which there is connected one end of a coil 184. The opposite end of the coil 184 is grounded as at 186.

The switch 162 also includes a plunger 188 which passes through the coil 184. The plunger 188 carries a contact bridging member 190 which may be used to selectively bridge the contacts 168 and 170 or the contacts 174 and 176. The plunger 188 is normally so urged by means of a spring 192 so that the contact bridging member 190 bridges the contacts 168 and 170.

In lieu of the terminal 40 of the battery 36 being directly grounded, there is connected to the terminal 40 a wire 194 in lieu of the wire 44. Opposite end of the wire 194 is connected to the terminal 166. The terminal 172 is connected to the ground by means of a wire 196. Thus when the contact bridging member 190 bridges the contacts 168 and 170, the terminal 40 of the battery 36 is grounded in a normal manner.

Extending between the terminals 166 and 178 is a wire 198. Another wire 200 has one end connected to the termianl 180 and the opposite end thereof connected to the terminal 50 of the switch 48. Thus, when the contact bridging member 190 engages the contacts 174 and 176, the batteries 36 and 38 will be connected together in series.

In order that the coil 184 may be energized to operate the switch 162, there is connected to the terminal 182 a wire 202. The wire 202 has the opposite end thereof connected to the wire 119.

During the normal operation of the dual battery system 150, only one of the batteries 36 and 38 is utilized and is thus considered the main battery. The other of the batteries is maintained in the system and is considered a reserve battery. However, the electrical connections between the generator 16 and the batteries 36 and 38 are such that both the batteries are being charged once the output of the generator 16 has reached the predetermined charging rate. The battery which is maintained in the electrical system as the main battery is determined by the position of the switches 82 and 84.

Should it be desired that the batteries 36 and 38 be connected in series so that 12 volts will be available to the starter 12 for purposes of starting the vehicle engine, it is necessary that the switch 84 be moved to the opposite position from that illustrated in FIGURE 2. Then when the switches 108 and 120 are closed, the batteries 36 and 38 are connected in series and supply the starter 12 with 12-volt current.

In order that the contacts 134 and 136 of the switch 126 will not be used together in the event the switch 120 is manually held closed after the vehicle engine is started and the generator 16 has begun to produce current at the desired charging rate, the circuit breaker 152 is provided. The flow of the current through the circuit breaker 152 would be a short circuit across the battery 36 and as a result the heating coil 160 will be heated sufficiently for the bi-metallic arm 158 to move the contact 156 out of engagement with the contact 154. Thus damage to the switch 126 is prevented.

When it is desired to jump start a vehicle having a 12-volt electrical system from the vehicle on which the dual battery system 150 is a part, the batteries 36 and 38 may be placed in series to produce this desired voltage. This is accomplished by connecting the jump wires (not shown) to the terminal 42 of the battery 36 and to the terminal 40 of the battery 38. Then, the load starting switch 120 is closed. When switch 120 is closed, the batteries 36 and 38 are placed in series through the operation of the switch 162. It is to be understood that it is not necessary that the engine of the vehicle of which the dual battery system 150 is a part be operating. However, it is also not necessary that the engine of the vehicle not be operating inasmuch as the generator 16 may be charging during the jump starting operation.

Referring now to FIGURE 3 in particular, it will be seen that there is illustrated a multiple battery electrical system for vehicles which is referred to in general by the reference numeral 210. The electrical system 210 incorporates a conventional two battery system now used on diesel trucks and the like, which electrical system has been modified to incorporate an auxiliary or spare third battery.

The conventional diesel electrical system includes a starter 212 and the generator 214. Also the conventional diesel vehicle connectible system includes a first or main battery 216 and a second or reserve battery 218. The manner in which the terminals of the batteries 216 and 218 may be connected will be described with respect to the plus and minus terminals of the batteries. However, it is to be understood that the connections may be reversed, if reversed on both batteries. The battery 216 includes a terminal 220 which is connected to the ground by means of ground wire 222. Battery 216 also includes a negative terminal 224. The battery 218 includes a positive terminal 226 and a negative terminal 228.

The electrical system of the diesel vehicle includes a pair of solenoid switches which are referred to in general by the reference numerals 230 and 232. The solenoid switch 230 includes a housing 234 which carries an upper pair of opposed contacts 236 and 238. The contact 236 extends through the housing 234 and has connected thereto a terminal 240. The contact 238 also extends through the housing 234 and is connected to a terminal 242.

The housing 234 carries a third terminal 244 to which there is connected a coil 246, the opposite end of the coil 246 being grounded. Extending through the coil 246 is a plunger 248 which carries a contact bridging member 250 for bridging the contacts 236 and 238. The contact bridging member 250 is normally retained out of engagement with the contacts 236 and 238 by means of a coil spring 252.

Disposed in the lower part of the housing 234 is a pair of contacts 254 and 256. The contact 254 is connected to the terminal 240 by means of a wire 258. A similar wire 260 connects the contact 256 to the terminal 242.

Disposed below the contacts 254 and 256 is an insulated ring 262 which carries a pair of contacts 264 and 266. The contacts 264 projects upwardly from the insulated ring 262 and normally engages the contact 254. The contact 266 extends both upwardly and downwardly from the insulated ring 262 and normally engages the contact 256.

Extending through the insulated ring 262 and connected to the contact 264 is a wire 268. The wire 268 has the opposite end thereof connected to a terminal 270 carried by the housing 234. Also extending through the insulated ring 262 but connected to the contact 266 is a wire 272 which is connected to a terminal 274 carried by the housing 234. Another contact 276 is carried by the housing 234 in alignment with the contact 266 and is engaged by the contact 266 with the insulated ring 262 moved downwardly. The contact 276 is connected to a terminal 278 which projects beyond the housing 234.

Disposed within the housing 234 for engagement with the insulated ring 262 is an actuating member 280 which is engageable by an extension 282 of the plunger 248 to move the insulated ring 262 downwardly when the contact bridging member 250 is moved downwardly.

The solenoid switch 232 includes a housing 284 which carries a pair of opposed contacts 286 and 288. The contact 286 is connected to a terminal 290 which projects beyond the housing 284. The contact 288 is also connected to a terminal 292 which projects beyond the housing. The housing 284 carries a further terminal 294.

Disposed within the housing 284 is a coil 296 which is connected to the terminals 290 and 294. Extending through the coil 296 is a plunger 298 which carries a contact bridging member 300 which is normally disposed out of engagement with contacts 286 and 288, but which bridges the contacts when the coil 296 is energized.

The starter 212 is provided with a pair of terminals 302 and 304. Extending from the terminal 302 to the terminal 292 is a wire 306. Extending from the terminal 304 are wires 308, 310 and 312. The wire 308 is connected to the terminal 290, the wire 310 is connected to the terminal 270 and the wire 312 is connected to the terminal 228 of the battery 218.

The terminal 226 of the battery 218 is connected to the terminal 242 by means of a wire 314. Connected to the terminal 240 is a wire 316 which is in turn connected to a terminal 318 of an ammeter 320. The ammeter 320 has its second terminal 322 to which there is connected a wire 324. Disposed within the wire 324 is a fuse 326, a control switch 328 and a starter switch 330. The opposite end of wire 324 is connected to the terminal 244.

The generator 214 is grounded as at 332. The generator 214 also includes terminals 334 and 336. Incorporated in the electrical system is a voltage regulator 338 having terminals 340, 342 and 344. Extending between the terminals 336 and 340 is a wire 346 which connects the field of the generator 214 to the voltage regulator 348. Extending between the terminals 334 and 342 is a wire 348 which connects the armature of the generator to the voltage regulator 338. The terminal 344 is the so-called battery terminal and has connected thereto a wire 350 whose opposite end is connected to the terminal 322 of the ammeter 320.

The electrical system of the diesel vehicle also includes a second ammeter 352 which has a pair of terminals 354 and 356. The terminal 356 is connected to ground by means of the ground wire 358. Extending between the terminal 354 and the terminal 274 of the solenoid switch 230 is a wire 360. Electrical system also includes a wire 362 which extends between the terminals 278 and 294. Furthermore, the terminal 224 of the battery 216 is normally connected to the terminal 240 by switch 452.

When the original electrical system of the diesel vehicle is in the position illustrated, it will be readily apparent that the batteries 216 and 218 are disposed in parallel. However, when the starter switch 330 is closed, the switch 328 having been closed, the solenoid 230 is actuated so as to bridge the contacts 236 and 238 placing the batteries 216 and 218 in series for starting purposes. Furthermore, actuation of the solenoid switch 230 results in the energization of the coil 296 and the resultant actuation of the solenoid switch 232 which is necessary to energize the starter 212.

The original electrical system of the diesel vehicle has been modified to incorporate a third or spare battery 364 having a negative terminal 366 and a positive terminal 368. Also, there are provided three solenoid switches which are referred to by the reference numerals 370, 372 and 374.

The solenoid switch 370 includes a housing 376 in which there is mounted in opposed relation an upper pair of contacts 378 and 380. The contact 378 is connected to a terminal 382 while the contact 380 is connected to a terminal 384.

Disposed below the contacts 378 and 380 are contacts 386 and 388. The contact 386 has connected thereto a terminal 390 and connected to the contact 388 is a terminal 392. The housing 376 also carries a pair of terminals 394 and 396.

Disposed within the housing 376 is a coil 398 which extends between the terminals 394 and 396. Passing through the coil 398 is a plunger 400 which carries a contact bridging member 402. The contact bridging member is normally retained in engagement with contacts 378 and 380 by means of a spring 404. However, when the coil 398 is energized, the contact bridging member 402 will move downwardly and bridge the contacts 386 and 388.

The solenoid switch 372 includes a housing 406 in which there is mounted a pair of opposed contacts 408 and 410. The contact 408 has connected thereto a terminal 412 whereas the contact 410 has connected thereto a terminal 414. Also carried by the housing 406 is a pair of terminals 416 and 418.

Disposed within the housing 406 is a coil 420 which is connected to the terminals 416 and 418. Passing through the coil 420 is a plunger 422 which carries a contact bridging member 424. The contact bridging member 424 is normally retained out of engagement with the contacts 408 and 410 by means of a spring 426. However, when the coil 420 is energized, the contact bridging member 424 will be pulled into engagement with the contacts 410 and 408.

The solenoid switch 374 includes a fixed contact 428 and a movable contact 430, the contact 430 being carried by an arm 432. Associated with the arm 432 is a plunger 434 which passes through a coil 436. Also associated with the plunger 434 is a holding coil 438 which has one end thereof connected to the contact 428. The opposite end of the coil 438 has connected thereto a wire 440 which is in turn connected to a fixed contact 442 of a circuit breaker 444 which is of the thermal type. The circuit breaker 444 includes a bimetallic arm 446 which carries a movable contact 448. The bimetallic arm 446 is of such a nature whereby the contact 448 is normally in engagement with the contact 442. However, associated with the bimetallic arm 446 is a heating coil 450 which after a predetermined period of time sufficiently heats the bimetallic arm 446 so as to move the contact 448 out of engagement with the contact 442. It is to be understood that the heating coil 450 is connected in parallel with the arm 446.

There is also provided a single-pole double-throw battery selector switch 452. The switch 452 includes a central terminal 454 and a pair of terminals 456 and 458. Extending from the terminal 456 and the arm 446, which is electrically connected to the contact 448, is a wire 460. Also connected to the terminal 456 is a wire 462 which is connected to the terminal 224 of the battery 216. Extending between the terminal 458 and the contact 430 is a wire 464. A wire 466 extends from the terminal 458 to the terminal 366 of the battery 364. The terminal 454 is connected to the terminal 240 by means of a wire 468.

The terminal 384 is grounded by means of a ground wire 470. The terminal 390 is connected to the terminal 382 by means of a wire 472. The terminal 390 is also connected to the terminal 368 of the battery 364 by a wire 474. The terminal 392 is connected to the terminal 226 of the battery 218 by means of a wire 476. Also, the terminal 394 is connected to the terminal 368 of the battery 364 by a wire 478 in which there is incorporated a push-button switch 480.

Referring now to solenoid switch 372, it will be seen that the terminal 412 thereof is connected to the terminal 366 of the battery 364 by means of a wire 482. Also, the terminal 412 is connected to the terminal 416 by means of a wire 484. The terminal 416 is in turn connected to the terminal 396 by a wire 486 and the terminal 418 is connected to the terminal 394 by a wire 488. The terminal 414 is connected to the terminal 228 of the battery 218 by means of a wire 490.

From the foregoing, it will be seen that by operating the battery selector switch 452, the battery 364 may be selectively placed in the original electrical system of the diesel vehicle in lieu of the battery 216. Furthermore, when the generator is charging above a predetermined rate, the battery 364 is being charged irrespective of whether or not it is in the original electrical system. It should be noted that if the battery 364 is selectively used as the main battery in lieu of the battery 216, then the battery 216 will be the spare battery, as long as the battery selector switch is in the proper position, and the battery 216 will take a charge from the generator each time the engine is speeded up sufficiently, but will not be subject to discharge when the engine speed is at the idling speed. Thus the battery 216 can be kept fully charged as a spare and either the battery 216 or the battery 364 acts as a main or spare battery relative to each other. Also, from the foregoing it should be noted that by pressing the switch 480 simultaneously with the starter button 330, the battery 364 can be placed in parallel with a possible defective battery 218, and thus the two batteries 218 and 364, being parallel with one another, would be placed in series with the battery 216 in starting the diesel vehicle. In this manner the battery 364 may function as a spare for the battery 218.

In view of the foregoing, it will be readily apparent that there have been devised several multiple battery electrical systems which are of such a nature whereby a spare battery is provided for a vehicle electrical system at all times. Also, it will be readily apparent that the spare battery is being charged, together with the other batteries, although it does not form an actual part of the electrical system.

In the original electrical system of the diesel vehicle the batteries 216 and 218 are normally connected in parallel both for charging purposes and for supplying electricity to the accessories of the vehicles, such as light, etc. On the other hand, when it is desired to start the diesel vehicle, as set forth above, the batteries 216 and 218 are disposed in series to produce 24 volts for the starter motor 212. This system has one major deficiency in that the batteries 216 and 218 are connected together at all times except when they are disposed in series for the starting of the diesel engine. As a result, when one of the batteries 216 and 218 is defective, for example, having a bad cell, this battery places a drain on the other battery until both batteries become defective. In order to eliminate this, it is proposed to mount in the original electrical system of the vehicle a solenoid controlled switch which is referred to in general by the reference numeral 492. The switch 492 is mounted in the wire 310 with the intermediate portions of the wire 310 being connected to contacts 494 and 496 of the switch 492. The contact 496 is fixed whereas the contact 494 is movable, the contact 494 being carried by a pivotally mounted arm 498 which is directly connected to a portion of the wire 310.

Acting upon the wire 498 is an electromagnetic device 500 which includes a coil having one end thereof connected to a wire 502 whose opposite end is connected to the terminal 342 of the voltage regulator 338. The other end of the coil 500 is grounded.

The solenoid control switch 492 is normally open with the result that the battery 218 is no longer connected to the battery 216, the battery 218 being solely a spare battery. On the other hand, when the generator 214 is generating at a prescribed rate, the electromagnetic device 500 is energized with the result that the contact 494 is moved into engagement with the contact 496 which then completes the charging circuit to the battery 218. From the foregoing, it will be readily apparent that the incorporation of the switch 492 in the wire 310 will permit the spare battery 218 to be charged in the normal manner and at the same time normally disconnects the battery 218 from the battery 216 so that when one of the two batteries 216 and 218 becomes defective the other will not have a continuous drain thereon from the defective battery. At this time it is pointed out that the switch 492 may be used separately or in combination with the spare battery 364 and the electrical circuit therefor.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A plural battery system for vehicles having a generator and a starter, including a pair of batteries and an electrical circuit connecting said batteries to said generator and said starter, each of said batteries having first and second terminals, first means electrically connecting said first terminals to said starter and said generator, and second means for selectively separately connecting said second terminals to said starter and said generator respectively, said second means including separate circuits between said second terminals and said starter, each of said separate circuits including a circuit completing switch, and battery interchange means for opening one of said circuit completing switches simultaneously with the closing of the other of said circuit completing switch.

2. The combination of claim 1, including circuit bridging means operatively connected to said battery interchange means for simultaneously closing both of said circuit completing switches to simultaneously electrically connect said batteries to said starter.

3. The combination of claim 2, including separate combined charging and power circuits connecting said batteries to said generator, said battery interchange means including a multiple switch, said multiple switch having a switch part controlling the completion of individual ones of said combined charging and power circuits.

4. The combination of claim 3, including generator output means for electrically interconnecting said combined charging and power circuit whereby both of said batteries may be simultaneously charged.

5. The combination of claim 4, including bridging circuit means operatively connected said battery interchange means for simultaneously closing both of said circuit completing switches to simultaneously electrically connect said batteries to said starter.

6. A standby battery system for an electrical control circuit having a voltage regulated generator and a starter motor, comprising, a main battery and a reserve battery, generator output responsive means operatively connected to the generator for connecting the main and reserve batteries in parallel to the generator during charging, a main relay starter circuit operative to connect the main battery alone to the starter, a reserve relay starter circuit operative to connect the reserve battery alone to the starter, interchange switch means operative in one position to connect the main battery to an accessory circuit and operatively condition the main relay circuit for operation and operative in a second position to connect the reserve battery to said accessory circuit and operatively condition the reserve relay circuit for operation, starter switch means operatively connected to the interchange switch means for operating that starter relay circuit that is operatively conditioned by the interchange switch means, and load starting switch means operatively connected to the interchange switch means to interconnect the main and reserve batteries for operating the other relay circuit.

References Cited in the file of this patent

UNITED STATES PATENTS

| | | |
|---|---|---|
| 2,085,275 | Schmidt | June 29, 1937 |
| 2,096,378 | Mitchell | Oct. 19, 1937 |
| 2,152,405 | Dreischerf | Mar. 28, 1939 |
| 2,278,745 | St. George | Apr. 7, 1942 |
| 2,521,969 | Dugan | Sept. 12, 1950 |
| 2,564,957 | Cermak | Aug. 21, 1951 |
| 2,629,059 | Baumheckel | Feb. 17, 1953 |
| 2,692,953 | Markett | Oct. 26, 1954 |
| 2,725,488 | Hueffed et al. | Nov. 29, 1955 |
| 2,729,750 | Draper et al. | Jan. 3, 1956 |
| 2,730,630 | Bruno | Jan. 10, 1956 |
| 2,835,826 | Vadas | May 20, 1958 |
| 2,866,907 | Gebhard | Dec. 30, 1958 |
| 2,913,587 | Gebhard | Nov. 17, 1959 |